(12) United States Patent
Li et al.

(10) Patent No.: US 11,562,075 B2
(45) Date of Patent: Jan. 24, 2023

(54) SECURE BOOTING METHOD, APPARATUS, DEVICE FOR EMBEDDED PROGRAM, AND STORAGE MEDIUM

(71) Applicant: SHENZHEN GOODIX TECHNOLOGY CO., LTD., Shenzhen (CN)

(72) Inventors: Qingbin Li, Shenzhen (CN); Dekun Chen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 519 days.

(21) Appl. No.: 16/712,956

(22) Filed: Dec. 12, 2019

(65) Prior Publication Data

US 2020/0117805 A1    Apr. 16, 2020

Related U.S. Application Data

(63) Continuation of application No. PCT/CN2018/101983, filed on Aug. 23, 2018.

(51) Int. Cl.
  *G06F 21/57*  (2013.01)
  *G06F 12/14*  (2006.01)
  (Continued)

(52) U.S. Cl.
  CPC ........ *G06F 21/575* (2013.01); *G06F 12/1408* (2013.01); *G06F 21/72* (2013.01);
  (Continued)

(58) Field of Classification Search
  None
  See application file for complete search history.

(56) References Cited

U.S. PATENT DOCUMENTS

| 10,057,243 | B1  | 8/2018 | Kumar |
| 2004/0065744 | A1* | 4/2004 | Shiraishi ............ G06F 12/0246 235/492 |

(Continued)

FOREIGN PATENT DOCUMENTS

| CN | 103258164 A | 8/2013 |
| CN | 103810421 A | 5/2014 |

(Continued)

OTHER PUBLICATIONS

D9: "Modeling and power supply calculation of inverter type regenerative energy feedback system", Modern Urban Transit, Nov. 2017, pp. 1-5.

(Continued)

*Primary Examiner* — Bassam A Noaman
(74) *Attorney, Agent, or Firm* — J.C. Patents

(57) ABSTRACT

The present disclosure provides a secure booting method, apparatus, device for an embedded program and a storage medium. The method includes: when a boot program is running, acquiring data of an application program, including signature information, public key information, parameter information, encrypted data, and a digital check code; performing signature check according to the signature information; performing integrity check according to the digital check code if the signature check passes; and performing data decryption according to the public key information and the parameter information if the integrity check passes. The present disclosure may improve information security.

20 Claims, 7 Drawing Sheets

(51) Int. Cl.
*G06F 21/72* (2013.01)
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/3247* (2013.01)

(56) References Cited

U.S. PATENT DOCUMENTS

| | | | | |
|---|---|---|---|---|
| 2015/0067313 A1* | 3/2015 | Zaidi | ..................... | G06F 21/572 |
| | | | | 713/2 |
| 2015/0378846 A1* | 12/2015 | Hagiwara | ........... | G06F 11/1438 |
| | | | | 714/19 |
| 2017/0103209 A1* | 4/2017 | Wooten | ................. | G06F 21/575 |
| 2017/0220487 A1* | 8/2017 | Jung | .................. | G06F 12/1408 |
| 2017/0269141 A1* | 9/2017 | Sporck | .................. | G06F 9/4401 |
| 2018/0039795 A1 | 2/2018 | Gulati | | |
| 2018/0189495 A1* | 7/2018 | Kim | ....................... | G06F 21/575 |
| 2018/0365424 A1* | 12/2018 | Callaghan | ............. | G06F 21/575 |
| 2019/0065361 A1* | 2/2019 | Liao | ........................ | G06F 3/064 |
| 2019/0245681 A1* | 8/2019 | Alwen | .................... | H04L 9/085 |

FOREIGN PATENT DOCUMENTS

| | | |
|---|---|---|
| CN | 104156659 A | 11/2014 |
| CN | 108154025 A | 6/2018 |
| WO | WO 2013/131065 A1 * | 9/2013 |
| WO | WO2013131065 | 9/2013 |

OTHER PUBLICATIONS

Extended European Search Report.
The Chinese International Search Report of corresponding International application No. PCT/CN2018/101983, dated May 22, 2019.

* cited by examiner

SECURE BOOTING METHOD, APPARATUS, DEVICE FOR EMBEDDED PROGRAM, AND STORAGE MEDIUM

CROSS-REFERENCE TO RELATED APPLICATIONS

This application is a continuation of International Application No. PCT/CN2018/101983, filed on Aug. 23, 2018. The contents of the above identified application are incorporated herein by reference in their entireties.

TECHNICAL FIELD

Embodiments of the present disclosure relate to security technologies and, in particular, to a secure booting method, apparatus, device for an embedded program, and a storage medium.

BACKGROUND

With continuous development of internet technologies (IT), more and more embedded programs are developed based on an embedded chip, so that a consideration of information security becomes more and more important. From the perspective of information security, various security devices on one hand provide guarantee for security services, and on the other hand protect their core secrets from being stolen.

Attackers generally may take advantage of information leaked during usage of embedded devices, and use techniques such as signal processing and statistical analysis to obtain private data; or may trigger running faults of the programs to obtain sensitive data by changing an operating environment of the devices.

Therefore, for the embedded devices, it is particularly important to improve information security during program running.

SUMMARY

Embodiments of the present disclosure provide a secure booting method, apparatus, device for an embedded program, and a storage medium, so as to improve information security during program running.

An embodiment of the present disclosure provides a secure booting method for an embedded program, including:

when a boot program for the embedded program is run, acquiring data of an application program; where the data of the application program includes: signature information, public key information, parameter information of the application program, encrypted data, and a first digital check code;

performing signature check on the public key information, the parameter information of the application program, the encrypted data, and the first digital check code according to the signature information;

performing integrity check on the public key information, the parameter information of the application program, and the encrypted data according to the first digital check code if the signature check passes; and decrypting the encrypted data according to the public key information and the parameter information of the application program if the integrity check passes.

An embodiment of the present disclosure further provides a secure booting apparatus for an embedded program, including:

an acquiring module, configured to when a boot program for the embedded program is run, acquire data of an application program; where the data of the application program includes: signature information, public key information, parameter information of the application program, encrypted data, and a first digital check code;

a checking module, configured to perform signature check on the public key information, the parameter information of the application program, the encrypted data, and the first digital check code according to the signature information; perform integrity check on the public key information, the parameter information of the application program, and the encrypted data according to the first digital check code if the signature check passes; and a decrypting module, configured to decrypt the encrypted data according to the public key information and the parameter information of the application program if the integrity check passes.

An embodiment of the present disclosure further provides an embedded device, including: a memory and a processor, where the memory is connected to the processor via a bus;

the memory is configured to store a program instruction and running data; and the processor is configured to, when invoking the program instruction and the running data stored in the memory, perform the secure booting method for the embedded program as described above.

An embodiment of the present disclosure further provides a computer readable storage medium having stored thereon a computer program, where the computer program, when being executed by a processor, implements the secure booting method for the embedded program as described above.

The secure booting method, apparatus, device for the embedded program and the storage medium as provided in the embodiments of the present disclosure may allow for: when a boot program for the embedded program is run, acquiring data of an application program, including signature information, public key information, parameter information of the application program, encrypted data, and a first digital check code; performing signature check on the public key information, the parameter information of the application program, the encrypted data, and the first digital check code according to the signature information; performing integrity check on the public key information, the parameter information of the application program, and the encrypted data according to the first digital check code if the signature check passes; and decrypting the encrypted data according to the public key information and the parameter information of the application program if the integrity check passes. In the method, signature check may be performed according to signature information, integrity check may be performed according to a digital check code, and then data decryption is performed, thereby ensuring accuracy and integrity of data of an application program, moreover, it is possible to effectively avoid information leakage resulting from data corruption of a program, thereby improving implementations of program functions and data security during running of the program.

BRIEF DESCRIPTION OF DRAWING(S)

In order to describe technical solutions in embodiments of the present disclosure or the prior art more clearly, accompanying drawings used in the description of the embodiments or the prior art will be briefly described hereunder. Obviously, the described drawings are merely some embodiments of present disclosure. For persons of ordinary skill in the art, other drawings may be obtained based on these drawings without any creative effort.

DESCRIPTION OF EMBODIMENTS

In order to make objectives, technical solutions, and advantages of the embodiments of the present disclosure clearer, the technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Unless otherwise defined, all technical and scientific terms used herein have meanings the same as those commonly understood by technical persons in the art to which this application applies. The terms used in the description herein is only intended to describe particular embodiments, but is not intended to limit the present disclosure. The term "and/or" as used herein includes any and all combinations of one or more associated items that are listed. Some embodiments of the present disclosure are described in detail below with reference to the accompanying drawings. The embodiments described below and features therein may be combined with each other in a case where there is no conflict.

The secure booting method, apparatus, device for the embedded program and the storage medium as provided below in the embodiments of the present disclosure may be applied to a device with an embedded chip. The device with the embedded chip may be termed as an embedded device. The embedded chip may be a secure embedded chip.

Figure 1:
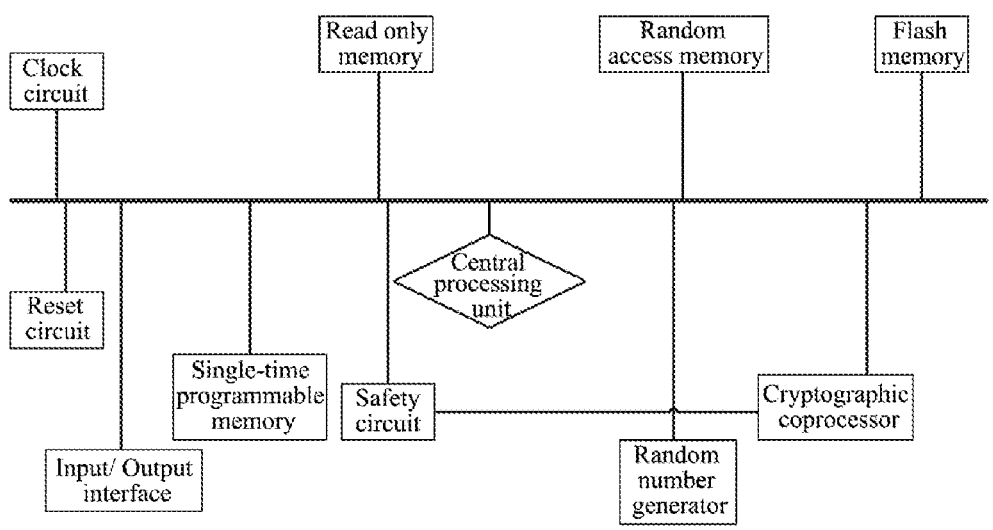
FIG. 1 is a schematic diagram illustrating a hardware architecture of an embedded chip according to an embodiment of the present disclosure.

Firstly, the embedded chip will be explained with regard to its hardware architecture. FIG. 1 is a schematic diagram illustrating a hardware architecture of an embedded chip according to an embodiment of the present disclosure. As shown in FIG. 1, the embedded chip may include therein: a Central Processing Unit (CPU), a Read Only Memory (ROM), a Random Access Memory (RAM), a Flash Memory, an Input/Output (I/O) interface, a safety circuit, a cryptographic coprocessor, a random number generator, a clock circuit, and a reset circuit. The flash memory may also be an Electrically Erasable Programmable Read-Only Memory (EEPROM). In a device with the embedded chip, the CPU, the ROM, the RAM, the flash memory, the I/O interface, the safety circuit, the cryptographic coprocessor, the random number generator, the clock circuit, and the reset circuit are respectively connected to a device bus. The safety circuit is also connected to the cryptographic coprocessor. The embedded chip may further include therein: a single-time programmable memory which may be an electric fuse (eFuse) memory or a one-time programmable memory. The single-time programmable memory may be loaded with data when the chip is allowed to leave the factory, and then may be readable only. The random number generator may generate a random number for deriving a key, and the cryptographic coprocessor may cooperate with the CPU to implement encryption, decryption, check, and other processes. It should be noted that, in the secure booting method for the embedded program as described above, when there is any check failure, incorrect running of a program, or abnormal data, an error state may be output via an output interface of the device, so as to check an error or an abnormal cause.

The secure booting method for the embedded program as provided in the embodiment of the present disclosure will be described hereunder using a number of examples in conjunction with the embedded chip shown in FIG. 1 above.

Figure 2:
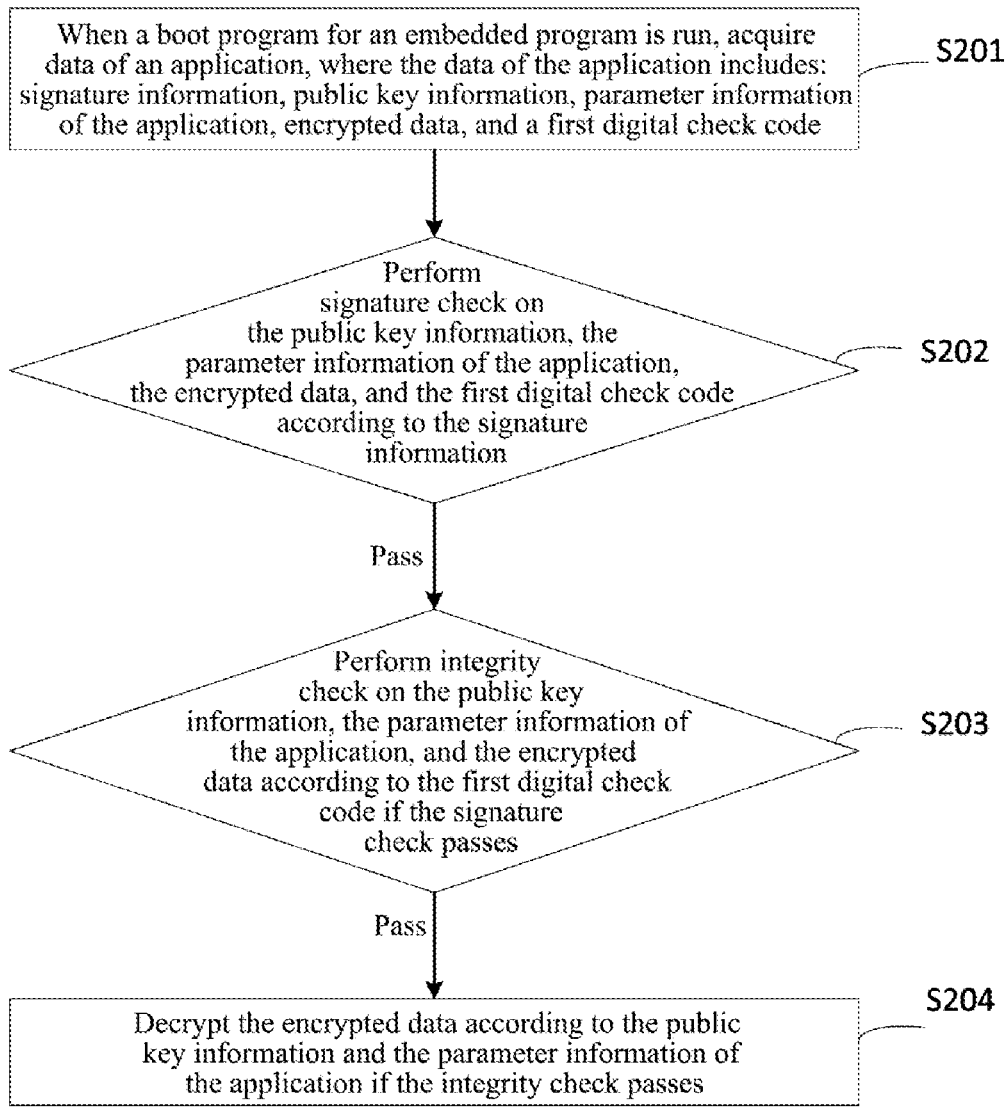
FIG. 2 is a flowchart of a secure booting method for an embedded program according to an embodiment of the present disclosure.

FIG. 2 is a flowchart of a secure booting method for an embedded program according to an embodiment of the present disclosure. The secure booting method for the embedded program can be applied to the device with embedded chip. The secure booting method for the embedded program may be implemented by software or by a combination of software and hardware. As shown in FIG. 2, the method may include:

S201: when a boot program for the embedded program is run, acquire data of an application program, where the data of the application program includes: signature information, public key (PUBLIC KEY) information, parameter information of the application program, encrypted data, and a first digital check code.

The application program may be a subscriber Firmware (FW) program, and thus the data of the application program may be termed as data of the FW program.

The signature information may be RSA signature information which is signature information upon computation of the public key information, the parameter information of the application program, the encrypted data, and the first digital check code by using an RSA algorithm.

The public key information may be RSA public key information and/or RSA parameter information. The RSA public key information may be public key information obtained by using an RSA algorithm, and the RSA parameter information may be parameter information of the RSA public key information.

The parameter information of the application program may be description information of the application program. The description information of the application program may include, for example, at least one of identification information, version information, and copyright information of the application program.

The encrypted data may be an instruction code of the application program and/or running data of the application program that are encrypted.

The first digital check code is a Hash-based Message Authentication Code (HMAC) corresponding to the public key information, the parameter information of the application program and the encrypted data in the data of the application program.

The data of the application program may be stored in a preset memory, such as a flash memory.

For example, which the acquiring the data of the application program in S201 may include:

controlling a controller for a flash memory to read the data of the application program stored in the flash memory.

That is to say, in the method shown above, the data of the application program is acquired from the flash memory.

S202: perform signature check on the public key information, the parameter information of the application program, the encrypted data, and the first digital check code according to the signature information.

In the method, the signature check may be performed on the public key information, the parameter information of the application program, the encrypted data, and the first digital check code according to the signature information by using an RSA algorithm. Such signature check may be termed as, for example, RSA signature check.

It is assumed that, if the signature information is RSA signature information, then in the method, an RSA algorithm may be used to process the public key information, the parameter information of the application program, the encrypted data, and the first digital check code to obtain a signature check code, and the obtained signature check code is compared with the signature information to achieve the signature check.

Exemplarily, if the obtained signature check code is the same as the signature information, it may be determined that the signature check passes; otherwise, if the obtained signature check code is different from the signature information, it may be determined that the signature check does not pass.

S203: perform integrity check on the public key information, the parameter information of the application program, and the encrypted data according to the first digital check code if the signature check passes.

In the method, the integrity check may be performed on the public key information, the parameter information of the application program, and the encrypted data according to the first digital check code by using an HMAC algorithm. Such integrity check may be termed as, for example, HMAC check.

It is assumed that, if the first digital check code is an HMAC check code, then in the method, an HMAC algorithm may be used to process the public key information, the parameter information of the application program, and the encrypted data to obtain an integrity check code, and the obtained integrity check code is compared with the first digital check code to achieve the integrity check.

Exemplarily, if the obtained integrity check code is the same as the first digital check code, it may be determined that the integrity check passes; otherwise, if the obtained integrity check code is different from the first digital check code, it may be determined that the integrity check does not pass.

S204: decrypt the encrypted data according to the public key information and the parameter information of the application program if the integrity check passes.

In the method, an Elliptic Curve Integrate Encrypt Scheme (ECIES) algorithm may be used to perform ECIES decryption on the encrypted data according to the public key information and the parameter information of the application program.

In an embodiment, in the method, the encrypted data may also be decrypted in combination with a private key of the application program. That is to say, in the method, the encrypted data may be decrypted according to the private key of the application program, the public key information, and the parameter information of the application program.

The private key of the application program may be, for example, a private key obtained from the ECIES algorithm, known as an ECIES private key. The private key of the application program may be used to encrypt and/or decrypt the data of the application program, which in S202 may be used to decrypt the encrypted data.

Figure 3:
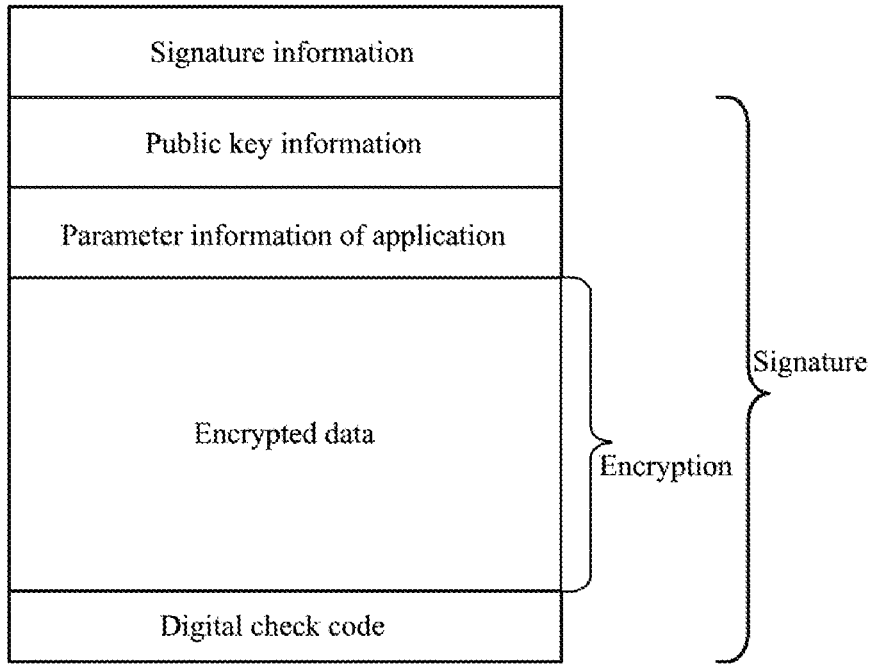
FIG. 3 is a structural diagram of data of an application program according to an embodiment of the present disclosure.

Exemplarily, FIG. 3 is a structural diagram of data of an application program according to an embodiment of the present disclosure. As shown in FIG. 3, the data of the application may include: signature information, public key information, parameter information of the application program, encrypted data, and a digital check code.

For the signature information, the public key information, the parameter information of the application program, the encrypted data, and the digital check code in FIG. 3, reference may be made to the above description, and details will not be described herein again. The data of the application program may be stored in a flash memory in a form of data structure shown in FIG. 3.

For the data of the application program shown in FIG. 3, the method may allow for: controlling a controller for a flash memory to read data of an application program from the flash memory; performing, according to a signature information, signature check on information other than the signature information in the data of the application program; performing, according to a digital check code, also known as a first digital check code, integrity check on information other than the signature information and the digital check code in the data of the application program after the signature check passes; and if the integrity check passes, decrypting, according to a private key of the application program in combination with a public key information and a parameter information of the application program, an encrypted data in the data of the application program to obtain a decrypted data.

In an embodiment, based on the secure booting method for the embedded program as shown in FIG. 2, the method may further include:

writing the decrypted data of the application program into a first storage region of an RAM.

The decrypted data of the application program may be the data obtained from decryption in S204 described above, and the decrypted data of the application program may include an execution code and/or running data of the application program.

In the method, the decrypted data of the application program may be written into the first storage region of the RAM, and the first storage region may be, for example, a storage region on an instruction RAM (IRAM) in the RAM.

The secure booting method for the embedded program as provided in the embodiment of the present disclosure may allow for: acquiring data of an application program, including signature information, public key information, parameter information of the application program, encrypted data, and a first digital check code; performing signature check on the public key information, the parameter information of the application program, the encrypted data, and the first digital check code according to the signature information; performing integrity check on the public key information, the parameter information of the application program, and the encrypted data according to the first digital check code if the signature check passes; and decrypting the encrypted data according to the public key information and the parameter information of the application program if the integrity check passes. In the method, signature check may be performed according to signature information, integrity check may be performed according to a digital check code, and then data decryption is performed, thereby ensuring accuracy and integrity of data of an application program and ensuring normal running of the application program, moreover, it is possible to effectively avoid information leakage resulting from data corruption of a program, thereby improving implementations of program functions and data security during running of the program.

Figure 4:
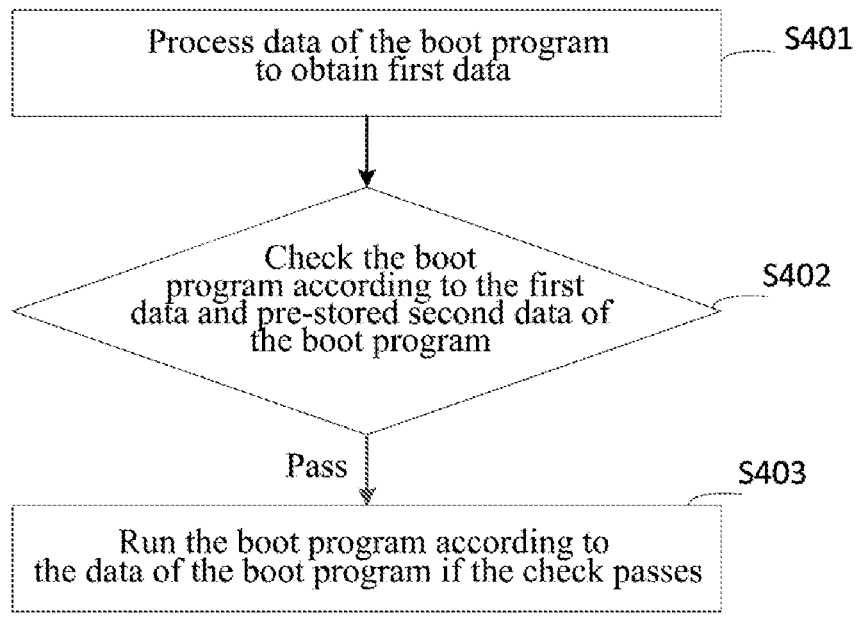
FIG. 4 is a flowchart of another secure booting method for an embedded program according to an embodiment of the present disclosure.

FIG. 4 is a flowchart of another secure booting method for an embedded program according to an embodiment of the present disclosure. As shown in FIG. 4, the method may further include:

S401: process data of the boot program to obtain first data.

The method illustrated in FIG. 4 may be performed prior to the above-described method illustrated in FIG. 2. In this method, S401 may be executed after a power on instruction is received. The power on instruction may be a power on instruction of a chip. After the power on instruction is received, a Power-On Reset (POR) may be performed according to the power on instruction. After the Power-On Reset is performed, the boot program may be triggered to perform a self-inspection, and the data of the boot program may be processed to obtain the first data.

The boot program may be a bootloader for the chip. In the method, the data of the boot program may be performed with a Cyclic Redundancy Check (CRC) calculation to obtain CRC data. The first data is the CRC data. The CRC data may be, for example, CRC32, i.e. 32-bit CRC data.

It should be noted that, before the boot program is processed, system initialization may be performed according to the power on instruction to initialize a function module related to chip enabling, such as at least one of a data buffer for chip configuration, a temperature detection enabling module, and an optical detection enabling module. The function module may include, for example, software and/or hardware modules related to chip booting.

S402: check the boot program according to the first data and pre-stored second data of the boot program.

The second data may be pre-stored data obtained based on the boot program by using the same processing algorithm as that in S401 described above. Exemplarily, if the first data is data obtained by using a CRC algorithm, the second data may be a CRC check code of the boot program. If the first data is 32-bit CRC data obtained by using the CRC algorithm, the second data may be a 32-bit CRC check code of the boot program.

In order to ensure accuracy of the second data, improve accuracy of the check, and ensure information security, the second data may be pre-stored in a preset position in an ROM.

In the method, the boot program may be checked by comparing the first data with the second data, for example. If the first data is the same as the second data, it may be determined that the check on the boot program passes; otherwise, if the first data is different from the second data, it may be determined that the data of the boot program is incomplete and may be subject to leakage or tampering, and therefore, it is determined that the check on the boot program fails, that is, the check does not pass.

If the check on the boot program passes, S403 described below may be proceeded.

If the check on the boot program does not pass, running of the boot program may stop.

S403: run the boot program according to the data of the boot program if the check passes.

S401 and S402 described above are also a part of process for running the boot program. Therefore, if the check in the method passes, the boot program is continued running according to the data of the boot program, that is, a flow of the boot program is continued running.

The secure booting method for the embedded program may allow for: processing data of the boot program to obtain first data; checking the boot program according to the first data and pre-stored second data of the boot program; and running the boot program according to the data of the boot program if the check passes. In the method, it is possible to continue running the boot program after the check on the boot program passes, thereby ensuring integrity of the data of the boot program, moreover, it is possible to effectively avoid information leakage resulting from data corruption of the boot program, and improve implementations of program functions and data security during running of the program.

The data of the boot program involved in the secure booting method for the embedded program in the embodiment described above may include: an instruction code of the boot program, and/or running data of the boot program.

In an embodiment, in the method for the program as described above, before the processing the data of the boot program to obtain the first data in S401, the method may further include:

fetching from a preset address of an ROM, and read the data of the boot program that is stored in the ROM.

The preset address of the ROM may include: a preset address of a first storage region of the ROM and a preset address of a second memory region of the ROM. The first storage region of the ROM may be, for example, a preset storage region on an instruction ROM (IROM), and the second storage region of the ROM may be, for example, a preset storage region on a data ROM (DROM). Each of the storage regions of the ROM as described above may be an ROM integrated on a chip. The fetching refers to a value of an address pointer.

The first storage region of the ROM may be stored with the instruction code of the boot program, and the second storage region of the ROM may be stored with the running data of the boot program.

The instruction code of the boot program may be solidified and stored in the first storage region of the ROM in an encryption mode during a chip manufacturing process. That is to say, the instruction code for the boot program stored in the first storage region of the ROM is an instruction code obtained by encrypting with a preset encryption key for ensuring storage security of the instruction code. Therefore, in the method, after the data of the boot program is read, the data of the boot program also needs to be decrypted to obtain the decrypted data of the boot program.

According to the method in this embodiment, a program self-inspecting module may be triggered by fetching from the preset address of the ROM, and the data of the boot program stored in the ROM is read by the program self-inspecting module.

After the data of the boot program stored in the ROM is read, S401 described above may be executed based on the read data of the boot program.

In an embodiment, in the secure booting method for the embedded program, in the case that the data of the boot program is read, the method may further include:

mapping the data of the boot program to a second storage region of an RAM.

During an implementation, a data mapping technique may be used, and the data of the boot program read from the ROM is mapped to the second storage region of the RAM by using the data mapping technique. The second storage region of the RAM may be a storage region on a data RAM (DRAM) in the RAM.

Taking the running data of the booting program as an example, the running data of the boot program may be mapped from the second storage region of the ROM, such as the DROM, to the second storage region of the RAM, such as the DRAM.

In the method, the data of the boot program may be mapped from the ROM to a second storage region of an RAM, and then the boot program is run by invoking the data of the boot program stored in the second storage region. That is to say, for the data of the boot program, the ROM is only used for storage, and the reading and the invoking are performed from the second storage region of the RAM during execution of the running process. In this way, even if the boot program stored in the second storage region of the RAM is subject to tampering, since the ROM is still stored with the data of the boot program, the invoking of the data of the boot program is then performed after acquiring the data of the boot program first from the ROM during its each running, and writing the data of the boot program to the second storage region of the RAM. Then, the data of the boot program that runs each time is actually secure data that has not been tampered.

Figure 5:
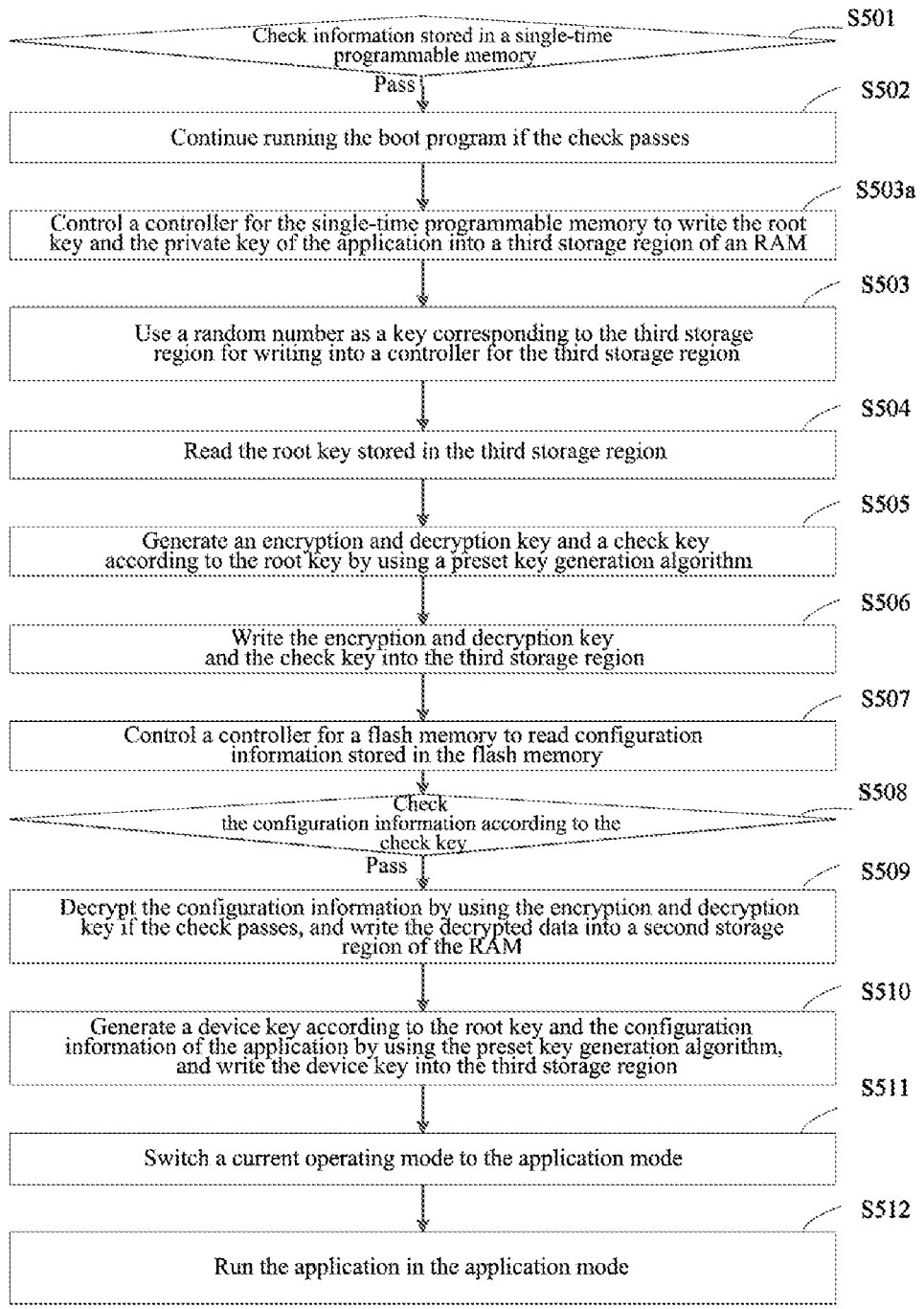
FIG. 5 is a flowchart of still another secure booting method for an embedded program according to an embodiment of the present disclosure.

FIG. 5 is a flowchart of still another secure booting method for an embedded program according to an embodiment of the present disclosure. As shown in FIG. 5, the method may further include:

S501: during running of the boot program, check information stored in a single-time programmable memory.

The information stored in the single-time programmable memory includes: a second digital check code.

In the method, the information stored in the single-time programmable memory may be processed by using a preset algorithm, and the information stored in the single-time programmable memory may be checked according to the information obtained from the processing and the second digital check code, in order to check correctness of the information stored in the single-time programmable memory. If the information obtained from the processing is different from the second digital check code, it may be determined that the check on the information stored in the single-time programmable memory fails, that is, the check does not pass; otherwise, if the information obtained from the processing is the same as the second digital check code, it may be determined that the check on the information stored in the single-time programmable memory succeeds, that is, the check passes.

As illustrated above, the second digital check code may be, for example, a Secure Hash Algorithm (SHA) value. Correspondingly, in the method, the information stored in the single-time programmable memory may be processed by using an SHA, and the information stored in the single-time programmable memory is checked according to an SHA value obtained from the processing and an SHA value stored in the single-time programmable memory.

If the check passes, S502 described below may be proceeded; otherwise, if the check does not pass, the running of the boot program may stop.

Since the single-time programmable memory may be programmed a single time only, the information stored therein cannot be tampered with, and information that is mainly stored has more importance, such as a root key, a private key of the application program, and a mode control field.

Neither the data of the boot program nor the data of the application program is stored in the single-time programmable memory.

S502: continue running the boot program if the check passes.

In this method, the check on the information stored in the single-time programmable memory may effectively ensure security of the information stored in the single-time programmable memory and ensure information security during the running of the program.

In an embodiment, the information stored in the single-time programmable memory further includes: a root key, and a private key of the application program.

After being converted by a safety circuit, the root key is used to derive a private key for a device and derive a key for a data encryption operation.

The application program may be a subscriber firmware program, and the private key of the application program may also be termed as a firmware private key.

The private key of the application program may be, for example, a private key obtained by an Elliptic Curve Integrate Encrypt Scheme (ECIES), known as an ECIES private key. The private key of the application program may be used to encrypt and/or decrypt information of the application program.

With continued reference to FIG. 5, the method may further include:

S503: control a controller for the single-time programmable memory to write the root key and the private key of the application program into a third storage region of an RAM.

If the single-time programmable memory is an eFuse memory, the controller for the single-time programmable memory may be an eFuse controller. The controller for the single-time programmable memory may be controlled by a master CPU.

The third storage region of the RAM may be a key storage region in the RAM. The key storage region may be a storage region on a KEYRAM of the RAM.

The method may allow for controlling the controller for the single-time programmable memory to write the root key and the private key of the application program into the third storage region through an interface of a safety circuit.

For the key stored in the third storage region, in the method, it is also possible to control a cryptographic coprocessor to read it from the third storage region through the safety circuit.

In the method, the root key and the private key of the application program read from the single-time programmable memory may be written into the third storage region of the RAM, such as the key storage region, so that sensitive data may be effectively prevented from leakage due to the running of the boot program.

In an embodiment, in order to ensure security of the third storage region of the RAM stored with various types of keys, in the method, the third storage region may also have corresponding keys. Before the controlling the controller for the single-time programmable memory to write the root key and the private key of the application program into the third storage region of the RAM in S503, the method may further include:

S503a: use a random number as a key corresponding to the third storage region for writing into a controller for the third storage region.

In the method, a key corresponding to the third storage region may be obtained by enabling a random number generator (TRNG) and converting a random number generated by the random number generator through the safety circuit, and then the key is written into the controller for the third storage region. The third storage region may be, for example, a KEYRAM storage region, and then the controller for the third storage region may be a controller for the KEYRAM storage region.

The key corresponding to the third storage region may include: an encryption key and a scrambling key corresponding to the third storage region. The encryption key corresponding to the third storage region may be used to encrypt information stored in the third storage region, and the scrambling key corresponding to the third storage region may be used to scramble the information stored in the third storage region.

In an embodiment, since the third storage region is a key storage region, keys stored therein are important; in order to ensure security of the information stored in the third storage region, the third storage region also has a corresponding key, while the key corresponding to the third storage region is written into the controller.

With the single-time programmable memory, a key stored therein is written into the third storage region during the running of the boot program, which facilitates subsequent invoking during the running of the application program. Then, in order to ensure data security of the third storage region, the random number generated by the random number generator may be used as the key of the third storage region.

In the method, the random number is used as the key corresponding to the third storage region and is written into the controller corresponding to the third storage region, which may effectively ensure the security of the information stored in the third storage region. Moreover, since the key corresponding to the third storage region is a random number, its decryption probability is relatively small. Even if the key corresponding to the third storage region that is stored in the controller corresponding to the third storage region may be decrypted, the key corresponding to the third storage region may change or be changed into other random number as long as the boot program is running again, there is no rule to follow, and thus it is more reliable.

In an embodiment, based on the foregoing method, the method may further include:

S504: read the root key stored in the third storage region.

The root key may be the root key written into the third storage region in S503 described above.

S505: generate an encryption and decryption key and a check key according to the root key by using a preset key generation algorithm.

The preset key generation algorithm may also be termed as a key generation function, which may be a symmetric key algorithm or an asymmetric key algorithm.

If the preset key generation algorithm is an asymmetric key algorithm, in the method, a public key algorithm function is also needed to calculate coordinates of a shared point, such as coordinates of a shared point for the ECIES key, and then the encryption and decryption key and the check key are obtained according to the root key and the coordinates of the shared point by using the preset key generation algorithm.

The encryption and decryption key may be an Advanced Encryption Standard (AES) key. The check key may be an HMAC key.

S506: write the encryption and decryption key and the check key into the third storage region.

In an embodiment, with continued reference to FIG. 5, the method may further include:

S507: control a controller for a flash memory to read configuration information stored in the flash memory.

Before S507 is executed, the controller for the flash memory may be initialized firstly, and after the initialization is completed, the controller for the flash memory may be controlled to read configuration information stored in the flash memory.

The configuration information stored in the flash memory includes: chip configuration information, and/or configuration information of the application program.

The chip configuration information may include, for example, information with chip configuration data (INFO), and the configuration information of the application program may include, for example, information with user configuration data (PARMA).

S508: check the configuration information according to the check key.

Figure 6:
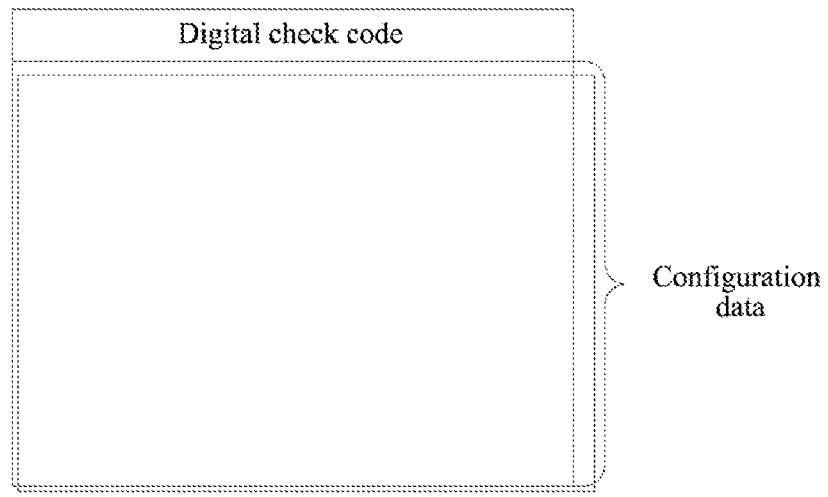
FIG. 6 is a structural diagram illustrating storage of configuration information according to an embodiment of the present disclosure.

FIG. 6 is a structural diagram illustrating storage of configuration information according to an embodiment of the present disclosure. As shown in FIG. 6, the configuration information stored in the flash memory may include: a digital check code and configuration data. The digital check code may be, for example, an HMAC check code.

In the method, integrity check may be performed on the configuration information according to the check key and the digital check code included in the configuration information.

It is assumed that, if the check key may be, for example, an HMAC key, and the digital check code included in the configuration information is an HMAC check code, then in the method, a comparison may be made according to the HMAC key and the HMAC check code in the configuration information, and then integrity check of the configuration information is achieved.

Exemplarily, in the method, it may be determined that the check on the configuration information passes if the HMAC key is the same as the HMAC check code in the configuration information; otherwise, it may be determined that the check on the configuration information does not pass if the HMAC key is different from the HMAC check code in the configuration information.

S509: decrypt the configuration information by using the encryption and decryption key if the check passes, and write the decrypted data into a second storage region of the RAM.

The encryption and decryption key may be, for example, an AES key, in the method, if the check on the configuration information passes, the configuration information may be decrypted according to the AES key, and the decrypted data is written into the second storage region, i.e. a DRAM of the RAM.

In the method, security of the configuration information may be ensured by the check key and the encryption and decryption key.

In an embodiment, if the configuration information includes the configuration information of the application program, with reference to FIG. 5, the method may further include:

S510: generate a device key according to the root key and the configuration information of the application program by using the preset key generation algorithm, and write the device key into the third storage region.

The configuration information of the application program involved in S510 may be the information read from the flash memory.

Since the data of the application program is stored in the flash memory, for the chip configuration information and/or the configuration information of the application program, at least three parts of data may be stored in the flash memory: the chip configuration information, the configuration information of the application program and/or the data of the application program, and user stored data (DATA).

Description is made hereunder by using an example in which the chip configuration information includes INFO information, the configuration information of the application program includes PARMA information, and the data of the application program includes FW data.

Figure 7:
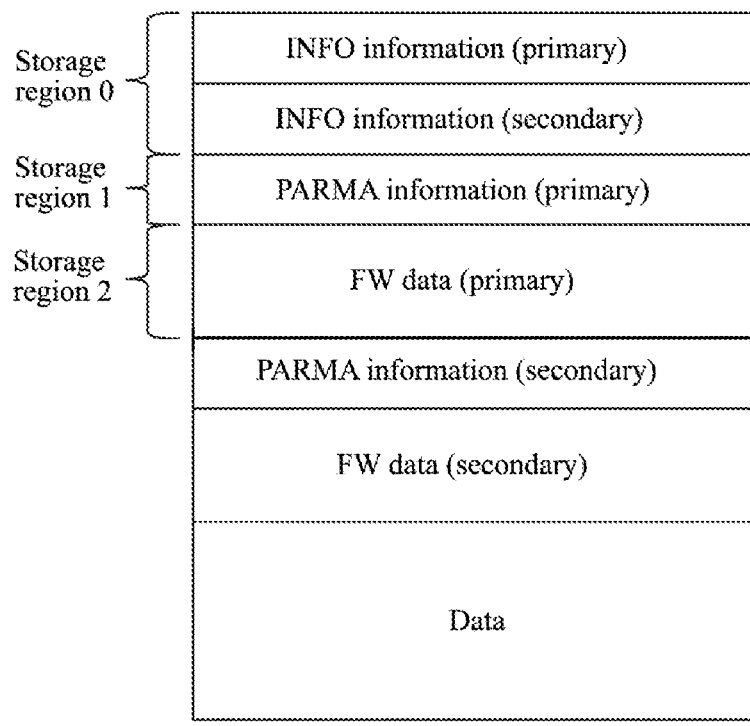
FIG. 7 is a structural diagram illustrating information storage of a flash memory according to an embodiment of the present disclosure.

FIG. 7 is a structural diagram illustrating information storage of a flash memory according to an embodiment of the present disclosure. As shown in FIG. 7, the flash memory may be stored with INFO information, PARMA information or FW data, and DATA. Apart from DATA, each type of information may have a primary storage region and a secondary storage region, respectively, and the same type of information has a primary storage region and a secondary storage region of the same size. Among them, the primary storage region of the INFO information and the secondary storage region of the INFO information may be sequentially arranged at a start position of the flash memory, then the primary storage region of the PARMA information and the FW data is sequentially arranged, then the secondary storage regions of the PARMA information and the FW data is arranged, and the storage region of DATA occupies the remaining space. The primary storage region of the INFO information and the secondary storage region of the INFO information may be, for example, a storage region 0 (region-0) in the flash memory; the primary storage region of the PARMA information may be, for example, a storage region 1 (region-1) in the flash memory; and the primary storage region of the FW data may be, for example, a storage region 2 (region-2) in the flash memory.

The INFO information may include: PARMA information or any one or more of FW data and DATA, start address information, end address information, and size information of the application program in the flash memory.

In an embodiment, the information stored in the single-time programmable memory as illustrated above further includes: a mode control field. The mode control field is configured to control an operating mode of a chip to be a debug mode, an application mode or a security mode.

The debug mode is a factory mode of the chip. The debug mode may be a default operating mode in which the chip is allowed to leave the factory, and the debug mode may be turned off by programming the mode control field in the single-time programmable memory. The debug mode is irreversible, that is, once turned off, it is impossible to enter again. The embedded chip also includes thereon: at least one register, which may be termed as a mode register. In the debug mode, the operating mode of the chip may be switched to the application mode by controlling a value of the mode register. Since the single-time programmable memory can only be programmed once, that is, data writing, it can be written only once when leaving the factory. The mode register is intended for switching to a subsequent mode, and needs to be accessed during the running of the boot program so that modes are switched.

The security mode is an operating mode in which the chip is powered on after the mode control field is programmed. In the security mode, the operating mode may be switched to the application mode by controlling the value of the mode register.

The application mode is an operating mode of the chip after the boot program is loaded. The application mode is a mode of the application in which the chip is normally run, and the operating mode may be switched to the application mode by controlling the value of the mode register. In the application mode, different access privileges may be given to different security modules on the chip according to control of memory access privileges.

An access privilege in the debug mode may be greater than an access privilege in the security mode, while the access privilege in the security mode may be greater than an access privilege in the application mode.

Figure 8:
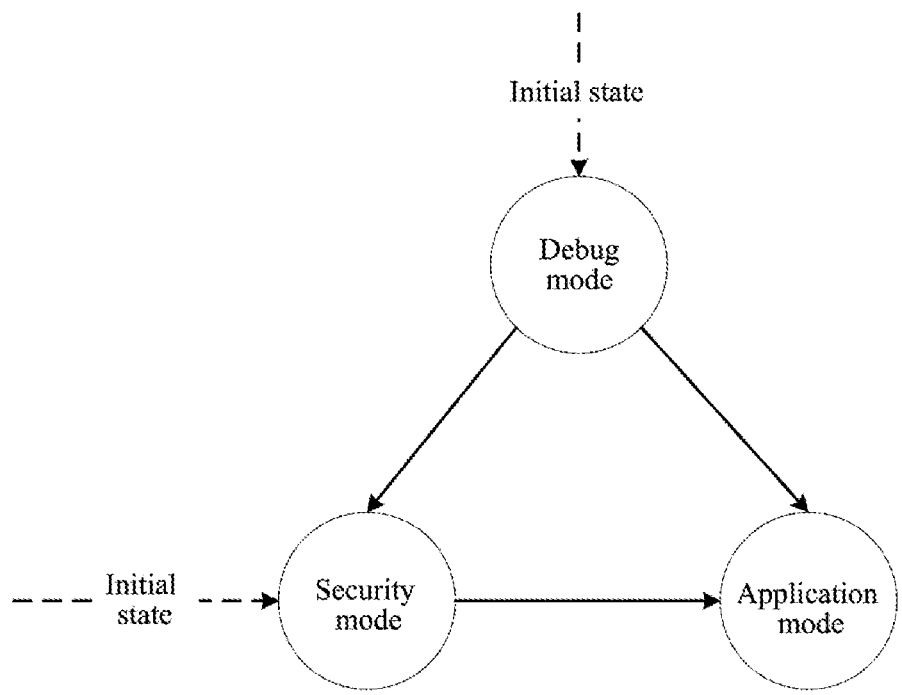
FIG. 8 is a diagram illustrating a state transition between different operating modes according to an embodiment of the present disclosure.

FIG. 8 is a diagram illustrating a state transition between different operating modes according to an embodiment of the present disclosure. As can be seen from FIG. 8, an initial operating mode of the chip may be either a debug mode, an application mode or a security mode. The debug mode may be switched to the security mode or to an application mode; the security mode may also be switched to the application mode.

On the basis of the secure booting method for the embedded program as described above, the secure booting method for the embedded program provided in the embodiment of the present disclosure may further include:

S511: Switch a current operating mode to the application mode.

S512: Run the application program in the application mode.

There may be at least one register on the embedded chip, which may be termed as a mode register. In the method, a value of the mode register may be configured by software writing, thereby switching from the current operating mode to the application mode. The value of the mode register may be a preset value of the mode register corresponding to the application mode.

The single-time programmable memory may also be stored with configuration information of the debug mode, configuration information of the security mode, and configuration information of the application mode.

In the method, after a switch to the application mode, the controller for the single-time programmable memory may be controlled to acquire the configuration information of the application mode from the single-time programmable memory, so that a memory access control privilege in the application mode may be configured according to the configuration information of the application mode for invoking the data of the application program and then running the application program.

In the application mode, there is also a corresponding memory access control privilege, so that it is possible to invoke the data of the application program from the first storage region in the above RAM according to the memory access control privilege in the application mode, and run the application program according to the data of the application program.

In the method, operating modes with different access privileges may also ensure that the boot program can cope with different security attack threats, thereby improving running security of the program and ensuring data security.

The following describes apparatus embodiments of the present disclosure, which can be used to implement the foregoing method embodiments of the present disclosure; and implementation principles and technical effects therebetween are similar.

Figure 9:
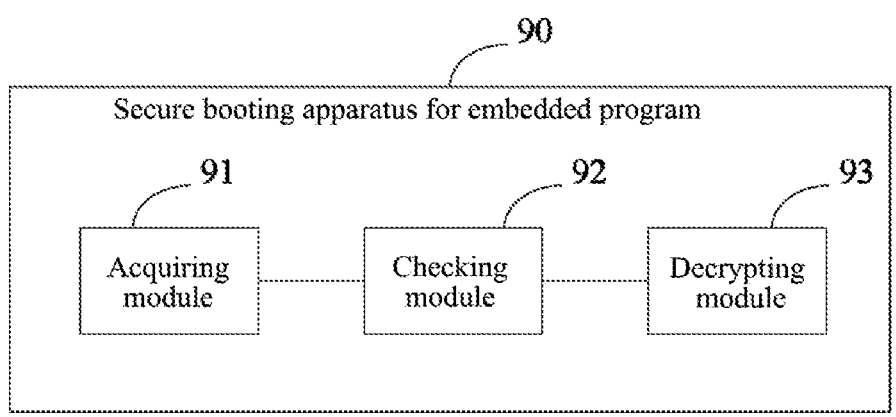
FIG. 9 is a schematic structural diagram of a secure booting apparatus for an embedded program according to an embodiment of the present disclosure.

FIG. 9 is a schematic structural diagram of a secure booting apparatus for an embedded program according to an embodiment of the present disclosure. The secure booting apparatus for the embedded program may be implemented by software and/or hardware, and may be integrated inside the device. As shown in FIG. 9, the secure booting apparatus 90 for the embedded program includes an acquiring module 91, a checking module 92, and a decrypting module 93.

The acquiring module 91 is configured to when a boot program for the embedded program is run, acquire data of an application program, where the data of the application program includes: signature information, public key information, parameter information of the application program, encrypted data, and a first digital check code.

The checking module 92 is configured to perform signature check on the public key information, the parameter information of the application program, the encrypted data, and the first digital check code according to the signature information; perform integrity check on the public key information, the parameter information of the application program, and the encrypted data according to the first digital check code if the signature check passes.

The decrypting module 93 is configured to decrypt the encrypted data according to the public key information and the parameter information of the application program if the integrity check passes.

In the secure booting apparatus for the embedded program, signature check may be performed according to signature information, integrity check may be performed according to a digital check code, and then data decryption is performed, thereby ensuring accuracy and integrity of data of an application program and ensuring normal running of the application program, moreover, it is possible to effectively avoid information leakage resulting from data corruption of a program, thereby improving implementations of program functions and data security during running of the program.

In an embodiment, the acquiring module 91 is specifically configured to control a controller for a flash memory to read the data of the application program stored in the flash memory.

In an embodiment, the secure booting apparatus 90 for the embedded program as described above further includes: a first writing module, configured to write the decrypted data of the application program into a first storage region of a random access memory RAM.

In an embodiment, the secure booting apparatus 90 for the embedded program as described above further includes a processing module and a running module.

The processing module is configured to process data of the boot program to obtain first data.

The checking module 92 is further configured to check the boot program according to the first data and pre-stored second data of the boot program.

The running module is configured to run the boot program according to the data of the boot program if the check passes.

In an embodiment, the data of the boot program includes: an instruction code of the boot program, and/or running data of the boot program.

In an embodiment, the secure booting apparatus 90 for the embedded program as described above further includes:

a first reading module, configured to before the processing module processes the data of the boot program to obtain the first data, fetch from a preset address of an ROM, and read the data of the boot program that is stored in the ROM.

In an embodiment, the secure booting apparatus 90 for the embedded program as described above further includes:

a mapping module, configured to map the data of the boot program to a second storage region of an RAM.

In an embodiment, the information stored in the single-time programmable memory includes a second digital check code.

The checking module 92 is further configured to check, according to the second digital check mode, other information stored in the single-time programmable memory.

The running module is further configured to continue running the boot program if the check passes.

In an embodiment, the other information stored in the single-time programmable memory includes a root key and a private key of the application program.

The secure booting apparatus 90 for the embedded program as described above further includes:

a controlling module, configured to control a controller for the single-time programmable memory to write the root key and the private key of the application program into a third storage region of an RAM.

In an embodiment, the secure booting apparatus 90 for the embedded program as described above further includes:

a second writing module, configured to before the controlling module controls the controller for the single-time programmable memory to write the root key and the private key of the application program into the third storage region of the RAM, use a random number as a key corresponding to the third storage region for writing into a controller for the third storage region.

In an embodiment, the secure booting apparatus 90 for the embedded program as described above further includes:

a second reading module, configured to read the root key stored in the third storage region;

a generating module, configured to generate an encryption and decryption key and a check key according to the root key by using a preset key generation algorithm; and a third writing module, configured to write the encryption and decryption key and the check key into the third storage region.

In an embodiment, the controlling module is further configured to control a controller for a flash memory to read configuration information stored in the flash memory.

The checking module 92 is further configured to check the configuration information according to the check key.

The decrypting module 93 is further configured to decrypt the configuration information by using the encryption and decryption key if the check passes.

The third writing module is further configured to write the decrypted data into a second storage region of the RAM.

In an embodiment, the configuration information includes: chip configuration information, and/or configuration information of the application program.

In an embodiment, if the configuration information includes the configuration information of the application program;

the generating module is further configured to generate a device key according to the root key and the configuration information of the application program by using the preset key generation algorithm.

The third writing module is further configured to write the device key into the third storage region.

In an embodiment, the information stored in the single-time programmable memory further includes a mode control field; the mode control field is configured to control an operating mode of a chip to be a debug mode, a security mode or an application mode;

the debug mode is a factory mode of the chip;

the security mode is an operating mode in which the chip is powered on after the mode control field is programmed; and the application mode is an operating mode of the chip after the boot program is loaded.

In an embodiment, the secure booting apparatus 90 for the embedded program as described above further includes:

a switching module, configured to switch a current operating mode to the application mode, where the current operating mode is the debug mode or the security mode.

The running module is further configured to run the application program in the application mode.

The secure booting apparatus for the embedded program provided in this embodiment may perform any secure booting method for the embedded program shown in FIG. 1 to FIG. 8; for specific implementations and effective effects thereof, reference may be made to the foregoing description, and details will not be described herein again.

Figure 10:
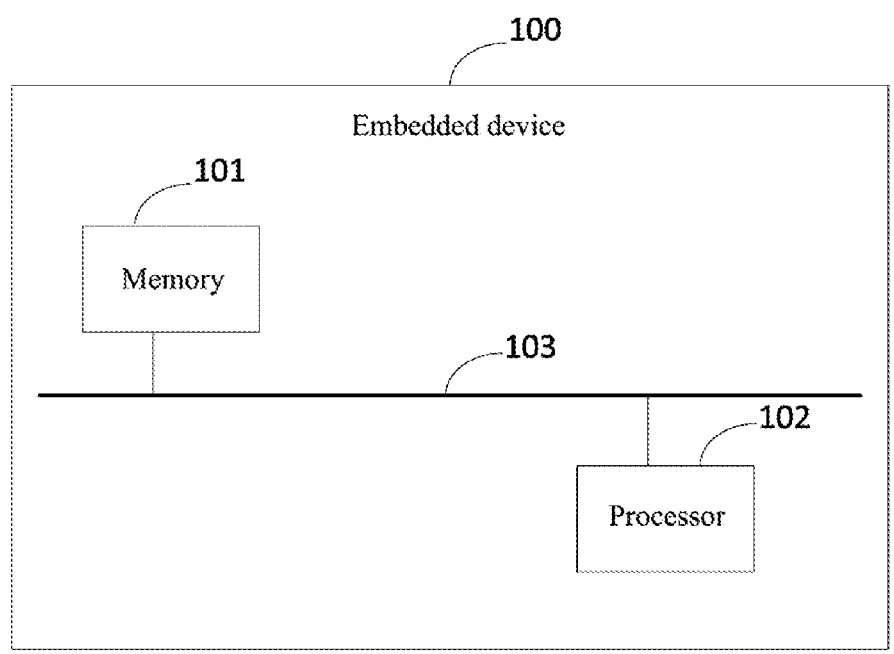
FIG. 10 is a schematic structural diagram of an embedded device according to an embodiment of the present disclosure.

FIG. 10 is a schematic structural diagram of an embedded device according to an embodiment of the present disclosure. As shown in FIG. 10, the embedded device 100 in this embodiment includes: a memory 101 and a processor 102. The memory 101 is connected to the processor 102 via a bus 103.

The memory 101 is configured to store a program instruction.

The processor 102 is configured to when invoking the program instruction stored in the memory 101, perform steps of:

when a boot program for an embedded program is run, acquiring data of an application program, where the data of the application program includes: signature information, public key information, parameter information of the application program, encrypted data, and a first digital check code;

performing signature check on the public key information, the parameter information of the application program, the encrypted data, and the first digital check code according to the signature information;

performing integrity check on the public key information, the parameter information of the application program, and the encrypted data according to the first digital check code if the signature check passes; and decrypting the encrypted data according to the public key information and the parameter information of the application program if the integrity check passes.

Optionally, the processor 102 is further configured to control a controller for a flash memory to read the data of the application program stored in the flash memory.

In an embodiment, the processor 102 is further configured to write the decrypted data of the application program into a first storage region of an RAM.

In an embodiment, the processor 102 is further configured to process data of the boot program to obtain first data; check the boot program according to the first data and pre-stored second data of the boot program; and run the boot program according to the data of the boot program if the check passes.

In an embodiment, the data of the boot program includes: an instruction code of the boot program, and/or running data of the boot program.

In an embodiment, the processor 102 is further configured to fetch from a preset address of an ROM, and read the data of the boot program that is stored in the ROM.

In an embodiment, the processor 102 is further configured to map the data of the boot program to a second storage region of an RAM.

In an embodiment, the processor 102 is further configured to check, according to a second digital check code included in information stored in a single-time programmable memory, other information stored in the single-time programmable memory; and continue running the boot program if the check passes.

In an embodiment, the other information stored in the single-time programmable memory includes a root key and a private key of the application program.

The processor 102 is further configured to control a controller for the single-time programmable memory to write the root key and the private key of the application program into a third storage region of an RAM.

In an embodiment, the processor 102 is further configured to use a random number as a key corresponding to the third storage region for writing into a controller for the third storage region.

In an embodiment, the processor 102 is further configured to read the root key stored in the third storage region; generate an encryption and decryption key and a check key according to the root key by using a preset key generation algorithm; and write the encryption and decryption key and the check key into the third storage region.

In an embodiment, the processor 102 is further configured to control a controller for a flash memory to read configuration information stored in the flash memory; check the configuration information according to the check key; decrypt the configuration information by using the encryption and decryption key if the check passes, and write the decrypted data into a second storage region of the RAM.

In an embodiment, the configuration information includes: chip configuration information, and/or configuration information of the application program.

In an embodiment, if the configuration information includes the configuration information of the application program, the processor 102 is further configured to generate a device key according to the root key and the configuration information of the application program by using the preset key generation algorithm, and write the device key into the third storage region.

In an embodiment, the information stored in the single-time programmable memory further includes a mode control field; the mode control field is configured to control an operating mode of a chip to be a debug mode, a security mode or an application mode.

The debug mode is a factory mode of the chip;

the security mode is an operating mode in which the chip is powered on after the mode control field is programmed; and the application mode is an operating mode of the chip after the boot program is loaded.

In an embodiment, the processor 102 is further configured to switch a current operating mode to the application mode, and run the application program in the application mode; where the current operating mode is the debug mode or the security mode.

The electronic device provided in this embodiment may perform any secure booting method for the embedded program shown in FIG. 1 to FIG. 8; for specific implementations and effective effects thereof, reference may be made to the foregoing description, and details will not be described herein again.

An embodiment of the present disclosure further provides a computer readable storage medium having stored thereon a computer program, where the computer program may be executed by the above processor 102 shown in FIG. 10 to implement the secure booting method for the embedded program as described in any one of the above embodiments; for specific implementations and effective effects thereof, reference may be made to the foregoing description, and details will not be described herein again.

Persons of ordinary skill in the art may understand that, all or a part of the steps of the foregoing method embodiments may be implemented by hardware related to a program instruction. The foregoing program may be stored in a computer readable storage medium. When the program is run, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A secure booting method for an embedded program, comprising:
   when a boot program for the embedded program is run, acquiring data of an application program, wherein the data of the application program comprises:
   signature information,
   public key information,
   parameter information of the application program,
   encrypted data of the application program, and
   a first digital check code,
   wherein the parameter information of the application program includes at least one of version information and copyright information of the application program, wherein the signature information is information upon computation of the public key information, the parameter information of the application program, the encrypted data, and the first digital check code by using a first algorithm, and the first digital check code is a code for integrity check on the public key information, the parameter information of the application program, and the encrypted data;
   processing, by using the first algorithm corresponding to the signature information, the public key information, the parameter information of the application program, the encrypted data, and the first digital check code to obtain a signature check code;
   performing signature check by comparing the signature check code and the signature information;
   when the obtained signature check code is as same as the signature information, processing, by using a second algorithm corresponding to the first digital check code, the public key information, the parameter information of the application program, and the encrypted data to obtain an integrity check code, wherein the second algorithm is different from the first algorithm;
   performing integrity check by comparing the integrity check code and the first digital check code; and
   when the obtained integrity check code is as same as the first digital check code, decrypting, by using a third algorithm corresponding to a private key of the application program, the encrypted data according to the private key of the application program, the public key information and the parameter information of the application program, wherein the third algorithm is different from the first algorithm and the second algorithm.

2. The method according to claim 1, further comprising: writing the decrypted data of the application program into a first storage region of a random access memory (RAM).

3. The method according to claim 1, further comprising: processing data of the boot program to obtain first data; checking the boot program according to the first data and pre-stored second data of the boot program; and running the boot program according to the data of the boot program when the checking the boot program passes.

4. The method according to claim 3, wherein the data of the boot program comprises: an instruction code of the boot program, and/or running data of the boot program.

5. The method according to claim 4, before the processing the data of the boot program to obtain the first data, further comprising:
   fetching from a preset address of a read only memory (ROM), and reading the data of the boot program that is stored in the ROM.

6. The method according to claim 5, further comprising: mapping the data of the boot program to a second storage region of an RAM.

7. The method according to claim 3, further comprising: further checking, according to a second digital check code comprised in information stored in a single-time programmable memory, other information stored in the single-time programmable memory; and continuing running the boot program when the further checking passes.

8. The method according to claim 7, wherein the information stored in the single-time programmable memory further comprises a root key and a private key of the application program, the method further comprises: controlling a first controller for the single-time programmable memory to write the root key and the private key of the application program into a third storage region of an RAM.

9. The method according to claim 8, before the controlling the first controller for the single-time programmable memory to write the root key and the private key of the application program into the third storage region of the RAM, further comprising: using a random number as a key corresponding to the third storage region for writing into a second controller for the third storage region.

10. The method according to claim 8, further comprising:
    reading the root key stored in the third storage region;
    generating an encryption and decryption key and a check key according to the root key by using a preset key generation algorithm; and
    writing the encryption and decryption key and the check key into the third storage region.

11. The method according to claim 10, further comprising: controlling a third controller for a flash memory to read configuration information stored in the flash memory; checking the configuration information according to the check key; and decrypting the configuration information by using the encryption and decryption key when the checking the configuration information passes, and writing the decrypted data into a second storage region of the RAM.

12. The method according to claim 11, wherein the configuration information comprises: chip configuration information, and/or configuration information of the application program.

13. The method according to claim 12, wherein when the configuration information comprises the configuration information of the application program; the method further comprises:
generating a device key according to the root key and the configuration information of the application program by using the preset key generation algorithm, and writing the device key into the third storage region.

14. The method according to claim 13, wherein the information stored in the single-time programmable memory further comprises a mode control field; the mode control field is configured to control an operating mode of a chip to be a debug mode, an application mode or a security mode; the debug mode is a factory mode of the chip; the security mode is an operating mode in which the chip is powered on after the mode control field is programmed; and the application mode is an operating mode of the chip after the boot program is loaded.

15. The method according to claim 14, further comprising:
switching a current operating mode to the application mode, wherein the current operating mode is the debug mode or the security mode; and
running the application program in the application mode.

16. A secure booting apparatus for an embedded program, comprising: a memory, a processor, and a computer program stored on the memory and operable on the processor, wherein the processor, when running the computer program, is configured to:
when a boot program for the embedded program is run, acquire data of an application program, wherein the data of the application program comprises:
signature information,
public key information,
parameter information of the application program,
encrypted data of the application program, and
a first digital check code,
wherein the parameter information of the application program includes at least one of version information, and copyright information of the application program, wherein the signature information is information upon computation of the public key information, the parameter information of the application program, the encrypted data, and the first digital check code by using a first algorithm, and
the first digital check code is a code for integrity check on the public key information, the parameter information of the application program, and the encrypted data;
process, by using the first algorithm corresponding to the signature information, the public key information, the parameter information of the application program, the encrypted data, and the first digital check code to obtain a signature check code;
perform signature check by comparing the signature check code and the signature information;
when the obtained signature check code is as same as the signature information, process, by using a second algorithm corresponding to the first digital check code, the public key information, the parameter information of the application program, and the encrypted data to obtain an integrity check code, wherein the second algorithm is different from the first algorithm;
perform integrity check by comparing the integrity check code and the first digital check code; and
when the obtained integrity check code is as same as the first digital check code, decrypt, by using a third algorithm corresponding to a private key of the application program, the encrypted data according to the private key of the application program, the public key information and the parameter information of the application program, wherein the third algorithm is different from the first algorithm and the second algorithm.

17. The apparatus according to claim 16, wherein the processor is configured to control a controller for a flash memory to read the data of the application program stored in the flash memory.

18. The apparatus according to claim 16, wherein the processor is configured to:
write the decrypted data of the application program into a first storage region of a random access memory (RAM).

19. A non-transitory computer readable storage medium having stored thereon a computer program, wherein the computer program, when being executed by a processor, implements a secure booting method for an embedded program comprising:
when a boot program for the embedded program is run, acquiring data of an application program, wherein the data of the application program comprises:
signature information,
public key information,
parameter information of the application program,
encrypted data of the application program, and
a first digital check code,
wherein the parameter information of the application program includes at least one of version information, and copyright information of the application program, wherein the signature information is information upon computation of the public key information, the parameter information of the application program, the encrypted data, and the first digital check code by using a first algorithm, and
the first digital check code is a code for integrity check on the public key information, the parameter information of the application program, and the encrypted data;
processing, by using the first algorithm corresponding to the signature information, the public key information, the parameter information of the application program, the encrypted data, and the first digital check code to obtain a signature check code;
performing signature check by comparing the signature check code and the signature information;
when the obtained signature check code is as same as the signature information, processing, by using a second algorithm corresponding to the first digital check code, the public key information, the parameter information of the application program, and the encrypted data to obtain an integrity check code, wherein the second algorithm is different from the first algorithm;
performing integrity check by comparing the integrity check code and the first digital check code; and
when the obtained integrity check code is as same as the first digital check code, decrypting, by using a third algorithm corresponding to a private key of the application program, the encrypted data according to the private key of the application program, the public key information and the parameter information of the application program, wherein the third algorithm is different from the first algorithm and the second algorithm.

20. The method according to claim 1, wherein the application program is a subscriber firmware program, and the encrypted data of the application program comprises at least one of an instruction code of the application program that is encrypted, and running data of the application program that is encrypted.

\* \* \* \* \*